April 15, 1947.  E. G. BUSSE  2,419,115
BRAKE BEAM STRUCTURE
Filed Feb. 4, 1944
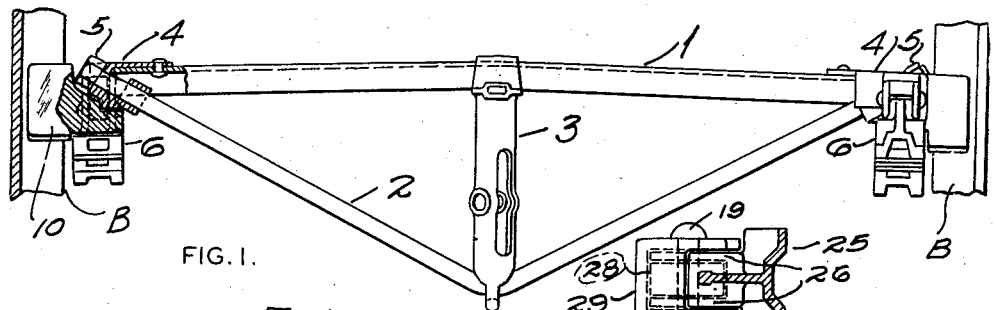
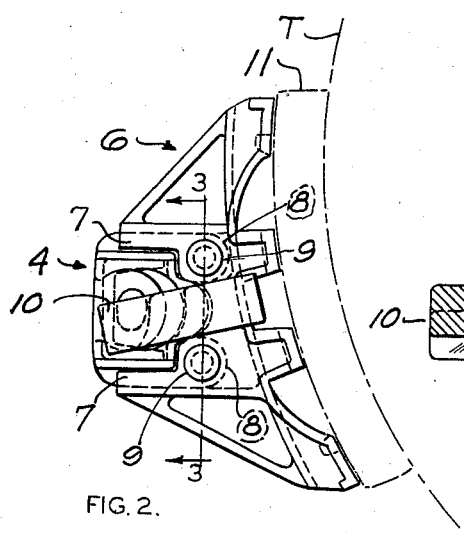
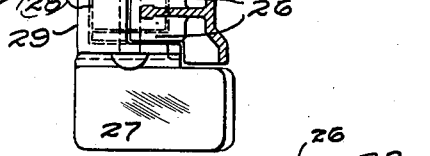
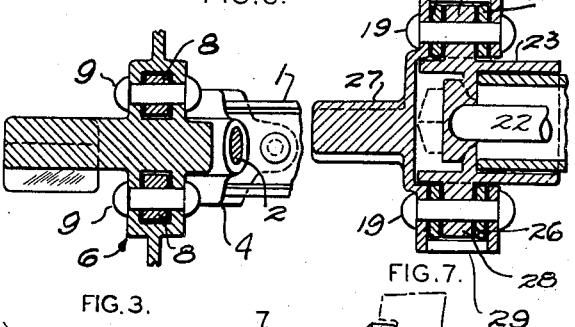
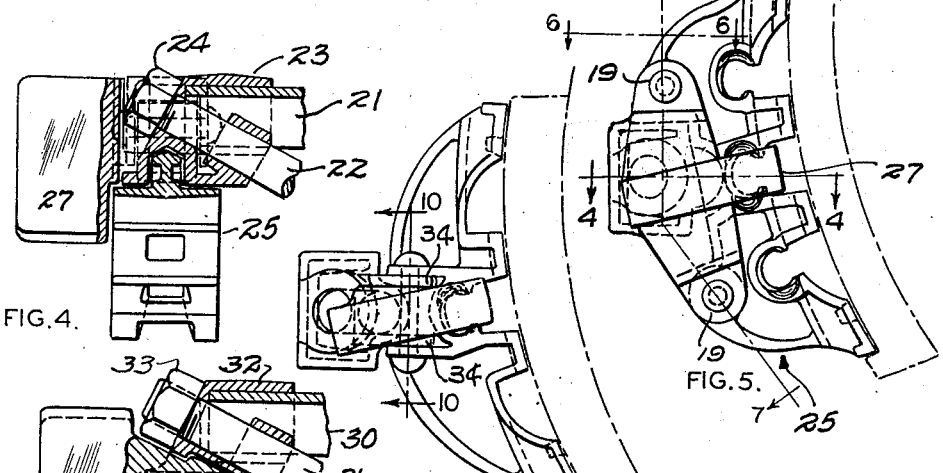
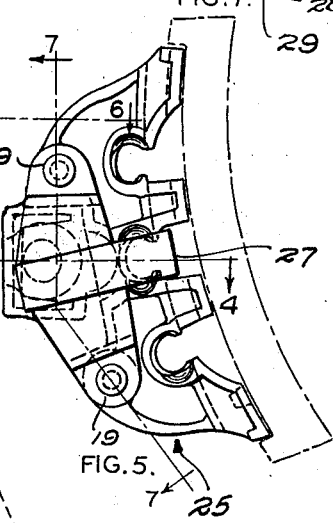
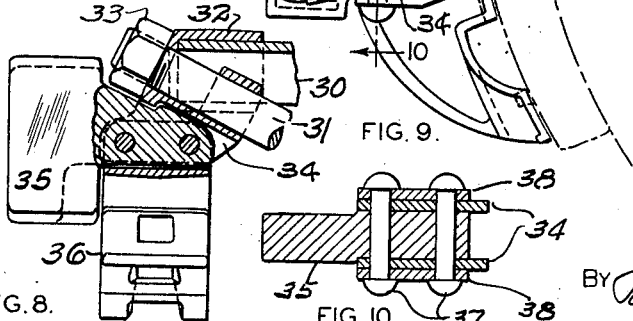
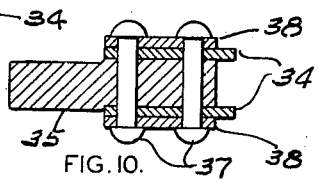
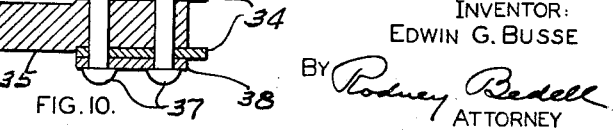
INVENTOR:
EDWIN G. BUSSE
BY Rodney Bedell
ATTORNEY Patented Apr. 15, 1947

2,419,115

UNITED STATES PATENT OFFICE 2,419,115

BRAKE BEAM STRUCTURE

Edwin G. Busse, Chicago, Ill., assignor to Chicago Railway Equipment Company, Chicago, Ill., a corporation of Illinois Application February 4, 1944, Serial No. 521,011

10 Claims. (Cl. 188—226)

The invention relates to railway brake beams of the built-up truss type and consists primarily in novel end structure for such beams.

Beams of the type referred to usually comprise a cambered compression member of channel-shape, U-shape or similar cross section, brake heads at the ends of the compression member each arranged for mounting a brake shoe and each having a pocket for receiving an end of the compression member, a strut at the middle of the beam apertured for the brake lever fulcrum, a tension member with its ends secured to the ends of the compression member either directly or through the brake heads or other thrust block elements.

It has long been a general practice to suspend the brake beam from the brake frame by swing hangers, the lower ends of which are received in recesses provided therefor in the brake head and the upper ends of which are seated in brackets on the truck frame.

Another manner of supporting the brake beam is to provide the side frame with a bracket adjacent to the end of the beam and underlying a part of the beam to slidingly support the beam during application and release of the brake. The bracket may engage a portion of the beam compression member spaced inwardly from the brake head, as shown in Patent 2,197,785, issued April 23, 1940, to the present applicant, and in D. M. Light Patent 2,201,441, issued May 21, 1940; or may engage an integral extension of the brake beam compression member, as shown in a copending application by the present applicant filed July 8, 1942, Serial No. 450,154; or an extension on the tension member or its nut or an extension on the brake head, as shown in Patents 2,226,551, issued December 31, 1940, and 2,254,514, issued September 2, 1941, both to the present applicant. Each of these arrangements involves a special construction of the compression member of the brake beam.

In a copending application filed by the present inventor January 31, 1944, Serial No. 520,459, now Patent No. 2,408,015, issued September 24, 1946, there is disclosed a beam end member separate from the beam tension and compression members and the brake head but holding them assembled and adapted to mount the brake head and to engage support brackets provided on the truck frame. The main object of the present invention is to support a built-up truss type brake beam from brackets on another truck part, such as the truck side frame, by engagement therewith of parts of the brake beam which do not in themselves contribute to the truss structure, whereby these support-engaging parts of the beam may be removed and, if desired, replaced without disturbing the truss adjustment and the assembly of the tension and compression members.

The support member may engage the brake head directly or an element separate from the brake head and the truss-forming members of the brake beam, and it is a further object of the invention to arrange the support so that the contours and dimensions of the truss type brake beam and brake head applied thereto do not depart from those standards which have been generally adopted for American railroads, thus rendering the beam as a whole interchangeable with other beams in general use and supported from the truck frame by swing hangers in the usual manner.

These and other detail objects of the invention are attained by the structure illustrated in the accompanying drawings, in which—

Figure 1 is a top view of a brake beam of the type referred to, a portion of the same being sectioned horizontally to better indicate the construction.

Figure 2 is a side elevation of one end of the beam including the head.

Figure 3 is a vertical section taken on the line 3—3 of Figure 2.

Figure 4 is a horizontal section through one end of a beam embodying another form of the invention and is taken upon the line 4—4 of Figure 5.

Figure 5 is a side elevation of the end of the beam structure shown in Figure 4.

Figure 6 is a top view and section taken on line 6—6 of Figure 5.

Figure 7 is a vertical section taken on the line 7—7 of Figure 5.

Figures 8 and 9 correspond to Figures 4 and 5 but illustrate another form of the invention.

Figure 10 is a vertical section taken on the line 10—10 of Figure 9.

The truss-forming portion of the beam includes a channel-shaped compression member 1, a round rod tension member 2, a strut 3, and end members 4, seated on the ends of the compression member, each having a box-like body portion open at one end to receive the beam compression and tension members and apertured at the opposite end for the passage therethrough of the end portion of the tension member and forming a seat for the tensioning nut 5 which is threaded onto the tension member. Members 1, 2 and 3 are substantially the same as are in general use in truss type brake beams. A brake head 6 is mounted on each end member 4 and includes a rearwardly opening recess with vertically spaced jaws 7 fitting over the top and bottom walls of end member 4. Forwardly projecting lugs 8 on the end member are received in recesses provided therefor in the head, and these lugs and the sides of the recesses therefor are apertured to receive rivets 9 extending longitudinally of the beam.

A flange 10 is formed integrally with the head and projects therefrom longitudinally of the beam outwardly from the side of the head and beyond the ends of the compression and tension members of the beam. Preferably the flange is inclined to the general plane of the beam as determined by the beam compression and tension members so as to flatly engage a similarly inclined supporting bracket B on the truck frame, whereby the beam will move along a line radial to the truck wheel, the tread of which is indicated at T, and the face of the brake shoe 11 will be presented normally to the tread of the wheel although the brake beam is below the level of the center of the wheel and the braking force is applied to the brake beam in the horizontal plane of the beam.

With this arrangement, the brake head is securely mounted upon the end member 4 and the brake head flange 10 directly engages the supporting bracket on the truck side frame. Hence the resistance to the rotation of the beam with the wheel, when the brake is applied, is direct from the support to the brake head instead of being transmitted through the end of the brake beam and elements attaching the head to the beam. The head may be removed from the beam and replaced without affecting the truss structure.

Figures 4-7 illustrate another form of the invention in which the general arrangement of the beam, including its compression member 21 and tension member 22, are the same as shown in Figure 1.

The end member 23 corresponds generally to the end member previously described in that it provides a pocket for receiving the end portions of the compression and tension members and a seat for the tensioning nut 24. The brake head 25 corresponds generally to brake head 6 described above and includes a rearwardly opening recess with vertically spaced jaws 26 fitting over the end member, but the details of the head attachment to the end member are different from those previously described and the bracket-engaging element 27 is formed separately from the head, as well as the end member.

The rearwardly projecting jaws 26 on the head are bifurcated vertically to receive between them vertically disposed ears 28 on end member 23 and the bracket-engaging flange 27 has vertically spaced U-sections 29 receiving between them the brake head jaws 26 and the end member ears 28. Rivets 19 extending longitudinally of the beam pass through elements 29, 28 and 26 and hold these parts assembled.

Preferably rivets 19 are equidistant from flange 27 and are on a center line perpendicular to flange 27. Hence the head may be reversed and applied to the opposite end of the beam, thus avoiding rights and lefts.

Figures 8-10 illustrate another form of the invention in which the general arrangement of the beam truss structure corresponds to that previously described including a compression member 30, a tension member 31, an end member 32, and a tensioning nut 33 but the end member is provided with vertically spaced forwardly extending substantially horizontal flanges 34 and the bracket-engaging member 35 extends between flanges 34. The brake head 36 has a rearwardly opening recess which receives the inwardly projecting portion of member 35 and the end member flanges 34. The end member, the supporting member and the brake head are secured together by vertically disposed rivets 37 at opposite sides of the center line of the brake head and gripping sides 38 of the head recess.

The functioning of the parts shown in Figures 4-10 is substantially the same as in the arrangement first described except that forces between the brake beams and its supporting bracket are passed through the elements which secure the brake head to the end member and, in the last-mentioned form, through the end member itself.

The distinguishing details of each arrangement possesses distinctive advantages and may be preferred in different installations, and it will be understood that the details of the structure may be varied otherwise than as shown without departing from the spirit of the invention, and the exclusive use of those modifications of the invention coming within the scope of the claims is contemplated.

What is claimed is:

1. In a railway truss type brake beam having a compression member and a tension member converging at the end of the beam, an end member seated on the end of the compression member and apertured for the passage of the end portion of the tension member, a tensioning device seated on said end member and engaging said portion, said end member having upright webs disposed transversely of the brake beam and extending above and below the level of the compression and tension members, separately formed structure assembled with the end member and comprising a brake head and a part projecting longitudinally of the beam beyond the end member and having a downwardly facing surface elongated transversely of the beam for slidable engagement with a bracket on an adjacent truck part to support the beam, said head including elements alongside said end member webs, and means extending through said elements and webs and securing said head and end member in assembled relation.

2. A railway truss type brake beam as described in claim 1 in which the downwardly facing surface of the part projecting beyond the end of the compression and tension members is inclined transversely of the general plane of the beam as determined by the compression and tension members to engage a similarly inclined support element on an adjacent truck part to guide the beam at an angle to said plane when the brakes are applied and released.

3. In a railway truss type brake beam having a compression member and a tension member converging at the end of the beam, an end member including a pocket-forming body seated on the end of the compression member and surrounding the end portion of the tension member, a tensioning device seated on said end member and engaging said portion, said end member having parts extending upwardly and downwardly from said body, a brake head having a horizontal recess with upper and lower sides fitting over said end member body and including flanges extending alongside said end member parts, and securing means extending through said end member parts and said flanges above and below the adjacent ends of the beam compression and tension members, there being a separately formed bracket applied to the outer side of the head over the end member and tensioning device and having ears alongside the outer flanges on the head and secured thereto by the securing means holding the head and end member assembled.

4. Structure as described in claim 1 in which the end member is symmetrical about a horizontal axis and may be reversed top for bottom for application to the compression and tension members at either end of the beam.

5. Structure as described in claim 1 in which the brake head is symmetrical about a vertical axis and may be applied to the end member at either end of the beam.

6. Structure as described in claim 1 in which the end member and the brake head are symmetrical about respective central axes and are applicable to the compression and tension members at either end of the beam.

7. Structure as described in claim 3 in which the end member and the brake head are symmetrical about respective central axes and are applicable to the compression and tension members at either end of the beam.

8. An end member for a truss type brake beam comprising a pocket structure open at one side to receive the converging end portions of the beam compression and tension members and provided with seats for the same and for a tensioning device on the tension member, there being ears projecting above and below said pocket structure and including sides extending transversely of the beam, said ears being apertured in a direction generally parallel to the length of the pocket structure, whereby said ears are adapted to have the upright web of a brake head applied to their sides and to receive rivets passing through such brake head web to mount the latter.

9. A railway brake head having a shoe mounting face and vertically spaced portions with recesses opening in the direction opposite to said face for receiving mounting elements on a brake beam and having a laterally extending flange intermediate said recessed portions for engaging supporting bracket structure on an adjacent truck part.

10. In a railway truss type brake beam having a compression member and tension member converging at the end of the beam, an end member seated on the end of the compression member and apertured for the passage of the end portion of the tension member, a tensioning device seated on said end member and engaging said portion, said end member having elements extending above and below the level of the compression and tension members, separately formed structure assembled with the end member and comprising a brake head and a part projecting longitudinally of the beam beyond the end member and elongated transversely of the beam and having a downwardly facing surface for slidable engagement with a bracket on an adjacent truck part to support the beam, said head including elements alongside said end member elements, and means extending through said elements and securing said head and end member in assembled relation.

EDWIN G. BUSSE.

REFERENCES CITED

The following references are of record in the file of this patent:

UNITED STATES PATENTS

| Number | Name | Date |
| --- | --- | --- |
| 803,874 | Buhoup et al. | Nov. 7, 1905 |
| 2,276,065 | Schaefer | Mar. 10, 1942 |
| 2,170,121 | Busch | Aug. 22, 1939 |
| 2,197,399 | Stillwagon | Apr. 16, 1940 |
| 2,368,854 | Leverenz | Feb. 6, 1934 |